ELECTRICAL SIGNAL STORAGE APPARATUS

Filed Feb. 1, 1954 2 Sheets-Sheet 1

EDWARD ARTHUR NEWMAN,
DAVID OSWALD CLAYDEN
Inventors
By Stevens, Davis, Miller & Mosher
Attorneys April 7, 1959 E. A. NEWMAN ET AL 2,881,411

ELECTRICAL SIGNAL STORAGE APPARATUS

Filed Feb. 1, 1954 2 Sheets-Sheet 2

EDWARD ARTHUR NEWMAN,
DAVID OSWALD CLAYDEN
*Inventors*
By Stevens, Davis, Miller & Mosher
*Attorneys*

2,881,411

ELECTRICAL SIGNAL STORAGE APPARATUS

Edward Arthur Newman, Teddington, and David Oswald Clayden, Heston, England, assignors to National Research Development Corporation, London, England Application February 1, 1954, Serial No. 407,419

Claims priority, application Great Britain February 4, 1953

12 Claims. (Cl. 340—174)

Figure 1:
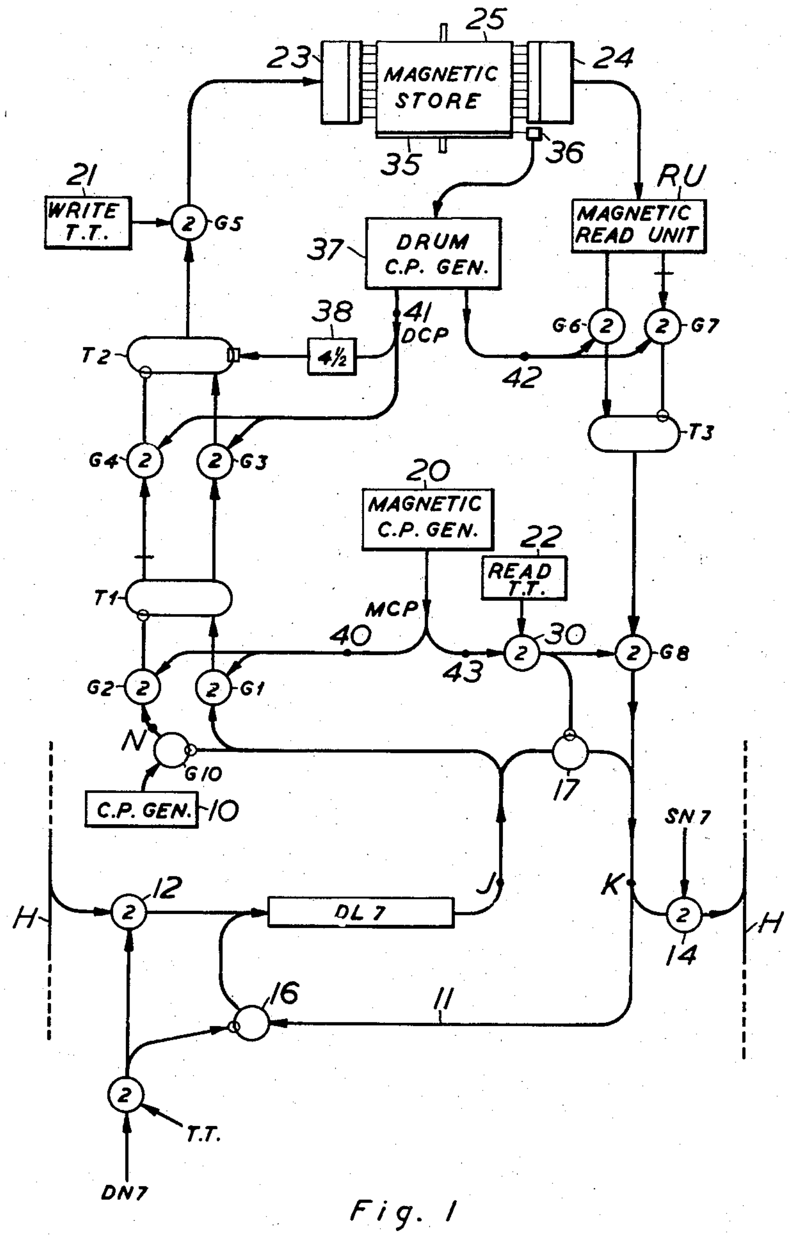

The present invention relates to electrical signal storage apparatus and is particularly concerned with arrangements for transferring serial trains of digit signals to or from an electrical storage apparatus.

In previous arrangements of this type, a master timing device or clock pulse generator is used to synchronise the storage apparatus and the trains of digit signals fed to and read from the store, where the synchronising of the storage apparatus refers to the timing of the actual recording or reproduction of serial trains of signals directed to or recalled from the storage or recording medium. The present invention provides input and output devices for a store which enables trains of digit signals, in step with a clock pulse generator, to be recorded in the store which is itself not maintained in synchronism with the clock pulse generator, and then subsequently to be reproduced from the store in synchronism with the clock pulse generator. By the invention, the timing of the store may vary up to one inter-digit period with respect to the timing of the clock pulse generator (where an inter-digit period is equal to the time interval between the beginning of successive clock pulses, that is the time allocated to successive digit signals in the trains of digit signals fed to and read from the store) even though it is necessary to know the timing of a read signal to a fraction of an inter-digit period in order to identify the digit because, for example, its recorded form varies during the inter-digit period. As a result the requirements of a storage apparatus may be made less exacting than when the store must be maintained in synchronism with an external timing device or clock pulse generator.

According to the present invention, a serial mode digit signal storage apparatus comprises a generator of store timing pulses at intervals of a given inter-digit period for timing stored signals, an input coincidence gate controlled by store timing pulses, means for applying to the input coincidence gate a train of digit signals in coalesced form and in step with an independent clock pulse generator having a repetition period which on the average is an inter-digit period but which may vary up to one inter-digit period relatively in phase whereby a signal output is produced on receipt of each store timing pulse which is in accordance with the nature of the digit signal then being received, means for writing the output of the input coincidence gate into the store during the pending inter-digit period in a form which is not the same throughout this inter-digit period, and means controlled by the store timing pulse generator for reading out stored digit signals in coalesced form and applying them to an output coincidence gate controlled by the clock pulse generator whereby a signal output is produced on receipt of each clock pulse in accordance with the nature of the stored digit signal being read.

The invention is particularly applicable to apparatus such as electronic digital computers or data handling apparatus which employ magnetic stores for storing digit signals. These magnetic stores have a magnetic recording surface (generally on a drum, wheel or disc, or tape) which is arranged to be movable with respect to writing and reading heads by which digit signals in a serial train are recorded on or read off the recording surface.

Generally, it is desirable to record signals on a magnetic recording surface in a magnetic form or pattern which changes during the actual recording operation in a characteristic manner, as the output from a magnetic read head is more pronounced when a change in the magnetization pattern is being read. As a result, in many magnetic recording systems it is necessary to know the timing of the read signal to within a fraction of an inter-digit period in order to interpret the nature of the read digit from the output of the read head.

An embodiment of the invention will now be described with reference to the drawings filed with this specification. This embodiment is in the form of a magnetic store in an electronic binary digital computer of the type described in copending U.S. patent application Serial No. 255,888, filed November 13, 1951 by Edward A. Newman et al., incorporating a writing and reading arrangement arcording to the present invention. The following description and drawings employ the Turing notation for representing basic circuit elements used in digital computers. This notation is fully explained in copending U.S. patent application Serial No. 202,615, now Patent No. 2,686,632, granted August 17, 1954.

Figure 2:
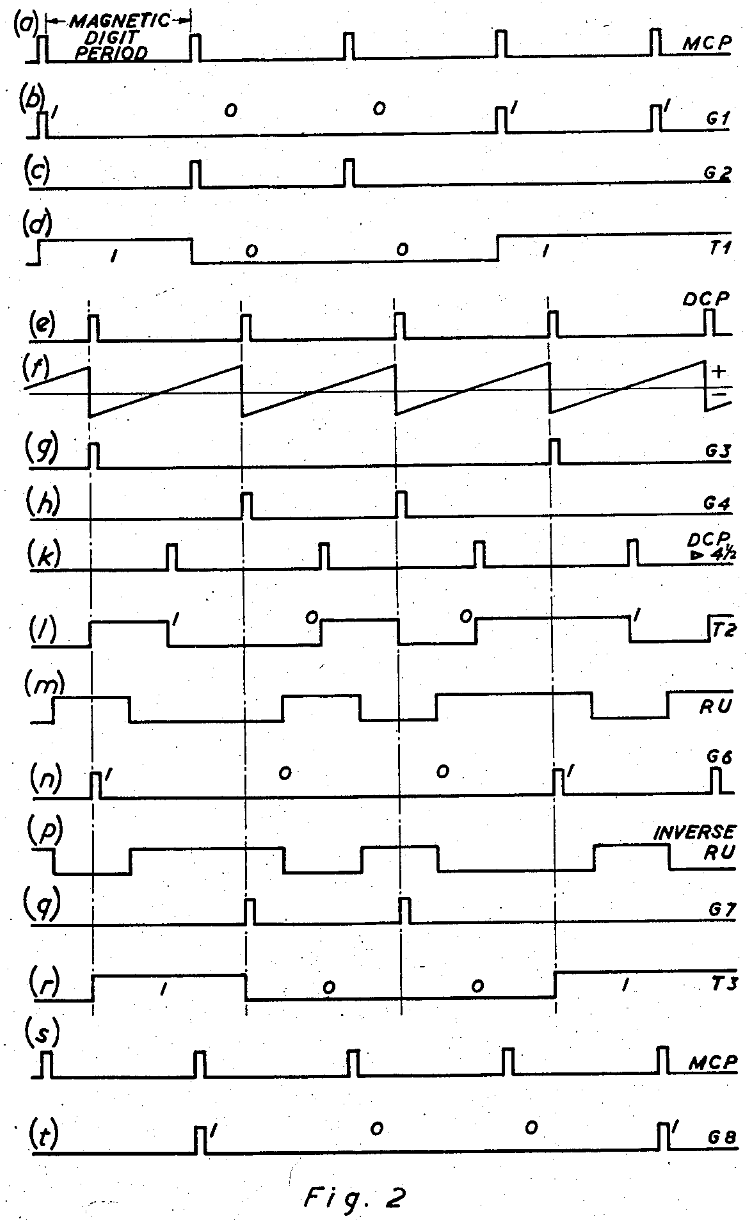

In the drawings:

Figure 1 shows a schematic circuit diagram of a magnetic store having writing and reading arrangements according to the invention; while Figure 2 shows waveforms of voltages occurring at various parts of the circuits shown in Figure 1.

The arrangement shown in Figure 1 is similar to the arrangement shown in Figure 1 of copending U.S. patent application Serial No. 255,888 with the arrangements for writing high-speed digit signals into, and reading high-speed digit signals from, a magnetic store 25 modified in accordance with the present invention. A delay line store DL7 is a typical store of a digital computer through which a serial train of 1024 high-speed digit signals continuously pass and circulate back round a conducting loop 11. Digit signals may be read out of the store DL7 through a gate 14 to a highway H communicating with the rest of the computer, or fed into the delay line store DL7 through a gate 12 when a gate 16 is closed to stop the circulation of the digit signals being replaced.

The manner in which the contents of the delay line DL7 are transferred to a track in the magnetic store 25 will now be described. The output from the delay line DL7 appearing on a terminal J is applied to the inhibiting connection of a gate G10 fed with high speed clock pulses from a generator 10, so that the output applied to a terminal N is the inverse of the output on the terminal J. The outputs on the terminals J and N are applied to gates G1 and G2 respectively. These gates are opened by magnetic clock pulses MCP as shown in Figure 2(*a*) which occur in step with every ninth high-speed clock pulse with the result that for a typical train of digit signals the outputs from the gates G1 and G2 are as shown in Figures 2(*b*) and 2(*c*) respectively. This provision for reducing the rate at which digit signals are applied to the magnetic store 25 is described in copending U.S. patent application Serial No. 255,888 and is not part of the present invention. The magnetic clock pulses MCP are produced by a magnetic clock pulse generator 20 which is a clock pulse generator independent of the storage apparatus as referred to previously, while magnetic clock pulses and magnetic digit periods are equivalent to clock pulses and inter-digit periods referred to previously.

The outputs from the gates G1 and G2 are applied to the setting and resetting inputs respectively, of a trigger T1 with the result that the trigger T1 produces an output voltage having a coalesced waveform as shown in Figure 2(*d*). This output and the inverse output are applied to gates G3 and G4 respectively which are controlled by store timing pulses called drum clock pulses DCP from a store timing pulse generator called a drum clock pulse generator 37.

These drum clock pulses are produced in the following manner. A special synchronising track 35 is laid down on the recording surface of the magnetic drum 25 from which synchronising pulses are picked up by a pick-up head 36 and passed to the drum clock pulse generator 37. The generator 37 generates clock pulses occurring once every magnetic digit period as shown in Figure 2(*e*) which are synchronised by the pulses received from the pick-up head 36. The magnetic recording drum 25 is rotated at a predetermined speed and it is necessary in accordance with the present invention to maintain indefinitely the timing of the rotating drum to within plus or minus half a magnetic digit period. This allows a given drum clock pulse to occur at any time after a given magnetic clock pulse provided it occurs before the next magnetic clock pulse. This degree of control may be exercised by a generator which produces a saw-tooth voltage as shown in Figure 2(*f*) which is triggered by the drum clock pulses. This sawtooth voltage can be negative for the first half of each climb and positive for the second half of each climb so that when it is strobed by magnetic clock pulses a voltage can be derived whose magnitude and sense corresponds to the extent that the drum clock pulses are out of step with the mid-times between magnetic clock pulses. If this derived voltage is then fed to a servo-system controlling the speed of rotation of the magnetic recording drum 25, the drum clock pulses will on the average occur at the mid-times between magnetic clock pulses. It will be made clear in the subsequent description that the optimum condition is when the drum clock pulses do occur at these mid-times. As shown in Figure 2(*e*), the drum clock pulses occur just before the mid-times and hence the derived voltage is used to retard the drum a little.

The outputs from the trigger T1 which are applied to the gates G3 and G4 are applied through these gates to the setting and resetting inputs of the trigger T2 when these gates are opened by drum clock pulses. The input from the gate G3 to the setting connection of the trigger T2 is as shown in Figure 2(*g*) and the input to its resetting connection from the gate G4 is as shown in Figure 2(*h*). The trigger T2 is also supplied on its changeover connection with drum clock pulses from the generator 37 through a delay device 38 which delays the pulses by half a magnetic digit period so that the input to the changeover connection is as shown in Figure 2(*k*). In the present case the magnetic digit period is nine times the high-speed digit period, consequently the delay device 38 is marked 4½ which indicates that it produces a delay of 4½ high-speed digit periods, that is to say half a magnetic digit period.

As a result of these three inputs, the trigger T2 produces an output having a waveform of the type shown in Figure 2(*l*). This waveform is the magnetic waveform as described in connection with Figure 2 of copending U. S. patent application Serial No. 255,888 and is characterised by an abrupt change of voltage at the mid-times of magnetic digit periods, the sense of the change indicating the nature of the binary digit being represented. This output from the trigger T2 is applied through a gate G5 to a head in the write head assembly 23 in order to lay down a corresponding magnetisation pattern on the recording surface of the drum 25. The gate G5 is open only when a write transfer is ordered by the control arrangements and a write transfer-timer 21 is therefore producing an output. Suitable control arrangements are described in copending U.S. patent application Serial No. 255,888.

The manner in which digit signals recorded on the drum 25 are reproduced and transferred to the delay line DL7 by the reading arrangements shown in Figure 1 will now be described.

Magnetization patterns on the recording drum 25 are picked up by one of the heads in a read head assembly 24 and supplied to a magnetic read unit RU which derives a voltage having a waveform as shown in Figure 2(*m*). This waveform is similar to the writing waveform shown in Figure 2(*l*) but it is advanced in phase by a quarter of a magnetic digit period. This phase advance, which is produced by advancing the angular setting of the read head assembly 24 with respect to the rotating drum 25, is made because the nature of the digit represented by the output of the read unit RU during each period of one magnetic digit period duration, is detected by the output level at a time one quarter of a magnetic digit period after the commencement of the period. One quarter of a magnetic digit period after the commencement is the mid-time of the leading half magnetic digit period but it will be appreciated that alternatively detection may be arranged to take place during the second half of each magnetic digit period.

The output from the magnetic read unit RU is applied to a gate G6 and the inverse output, as shown in Figure 2(*p*), is applied to a gate G7. The gates G6 and G7 are controlled by drum clock pulses so that the outputs from the gates G6 and G7 are as shown in Figures 2(*n*) and 2(*q*) respectively. These outputs are applied to the setting and resetting inputs respectively of a trigger T3 with the result that the voltage waveform produced on the output connection of the trigger T3, which is applied to a gate G8, is coalesced as shown in Figure 2(*r*).

When a read transfer is ordered, a read transfer-timer 22 produces an output which opens a gate 30 and thereby permits magnetic clock pulses, from the magnetic clock pulse generator 20, as shown in Figure 2(*s*) to be applied to an output coincidence gate G8 and an inhibiting gate 17. When these magnetic clock pulses are applied, the output from point J is blocked by the gate 17 and cannot reach point K, but the output from the trigger T3 can pass through the gate G8 at these times and reach point K and the circulation path of the delay line DL7. The output from the gate G8 is as shown in Figure 2(*t*) and it will be seen that this is the same signal train . . . 1001 . . . as the input to the trigger T1 from the point J after passing through the gate G1 and the delay line DL7 which was written into the magnetic store 25. The output from the magnetic store is delayed, however, by one magnetic digit period with respect to the input. This delay can be readily eliminated in practice by moving the read head assembly round the track path against the direction of movement of the oncoming recorded signals so that the read heads read off recorded signals one magnetic digit period earlier.

What we claim is:

1. A serial mode electrical digital storage apparatus including a first serial store, a second serial store, pulse lengthening means connected to the second store for producing a train of two-state digit signals in coalesced form, a first store clock pulse generator for producing first store clock pulses occuring at a varriable timing once during each digit signal, a first sampling means, connected to the said pulse lengthening means and to the said clock pulse generator, for sampling the two-state digit signals by the said clock pulses and means, connected to the said sampling means, for recording the output of the sampling means in the said first store.

2. A serial mode electrical digital storage apparatus including a first serial store, a second serial store, pulse lengthening means connected to the second store for producing a train of two-state digit signals in coalesced form, a first store clock pulse generator for producing first store clock pulses occurring at a variable timing once during each digit signal, a two-state signal generating means connected to the pulse lengthening means and to the said clock pulse generator, first sampling means connected to control the signal generating means, for sampling the said two-state digit signals by means of the said clock pulses and to put the signal generating means in one of two states corresponding to the state of the sampled digit signal, means connected to the signal generating means and to the said clock pulse generator for changing the state of the signal generating means at times between the occurrence of the said clock pulses and means for applying the output of the signal generating means to the said first serial store.

3. A serial mode electrical digital storage apparatus as claimed in claim 2 and wherein there is provided read means for reading two-state signals from the said first serial store, second sampling means, connected to the said clock pulse generator and to the read means, for sampling the two-state signals by means of the said clock pulses to produce two-state digit signals of coalesced form, a second clock pulse generator for producing clock pulses in a predetermined time relationship to digit signals in the said second serial store, a third sampling means, connected to the second sampling means and to the second clock pulse generator, for sampling the two-state digit signals of coalesced form from the said second sampling means by the clock pulses from the said second clock pulse generator and means for applying the output from the third sampling means to the second store.

4. A serial mode electrical digital storage apparatus as claimed in claim 3 and wherein the said first store is a rotatable magnetic drum driven in substantial synchronism with the said second clock pulse generator, the said first clock pulse generator comprising a track on the drum having pulses recorded at digit intervals around the track and a magnetic reading head situated near the said track.

5. A serial mode electrical digital signal storage apparatus comprising a first serial mode digit signal store having a generator of first store timing pulses for timing signals in the first signal store, the said pulses being periodic and occurring once and only once in each consecutive interval of a given inter-digit period, and a first store input coincidence gate controlled by first store timing pulses, a second serial mode digit signal store having a generator which is independent of the said generator of first store timing pulses and which generates second store timing pulses having a mean repetition period equal to an interdigit period but which may vary up to one digit period relatively in phase with the first store timing pulses, a write transfer path for applying signals from the second store to the first store input coincidence gate, means for applying digit signals from the second store to the first store input coincidence gate in a coalesced form in which each signal is in the same form during the whole of its inter-digit period whereby a signal output is produced on receipt of each first store timing pulse which is in accordance with the nature of the digit signal then being received, means for writing the output of the input coincidence gate into the first store during the current inter-digit period in a form which is not the same throughout this inter-digit period, an input coincidence gate in said second store and controlled by said second store timing pulses, a read transfer path for applying digit signals from the first store to the input coincidence gate of the second store, and means for applying digit signals from the first store to the input coincidence gate of the second store in coalesced form whereby a signal output is produced on receipt of each second store timing pulse in accordance with the nature of the digit signal then being read.

6. A serial mode electrical digital storage apparatus as claimed in claim 5 and wherein the said means for applying digit signals from the second store to the first store input coincidence gate comprises a first And gate connected to the second store timing pulse generator and to a negated output from the said second store, a second And gate connected to the said second store timing pulse generator and to an output from the said second store, a first trigger circuit, means for connecting the output from the second gate to normal input to the trigger circuit and means for connecting the output from the second gate to the inhibiting input of the trigger circuit.

7. A serial mode electrical digital storage apparatus as claimed in claim 6 and wherein the said first input coincidence gate comprises a third And gate connected to the negated output of the first trigger circuit and to the first store timing pulse generator, a fourth And gate connected to the normal output of the first trigger circuit and to the said first store timing pulse generator.

8. A serial mode electrical digital storage apparatus as claimed in claim 7 and wherein the said means for writing the output of the input coincidence gate into the first store comprises a second trigger circuit, means for connecting the output of the third And gate to the inhibiting input of the second trigger circuit, means for connecting the output of the fourth And gate to the normal input of the second trigger circuit, a delay unit having a delay of one-half inter-digit period connected between the said first store timing pulse generator and a change-over input to the second trigger circuit and means for applying the output of the second trigger circuit to the first serial mode digit store.

9. A serial mode electrical digital storage device as claimed in claim 5 and wherein the said means for applying digit signals from the first store to the input coincidence gate of the second store comprises a fifth And gate connected to the output from the first store, a sixth And gate connected to a negated output from the first store, means for connecting the first store timing pulse generator to the fifth gate and to the sixth gate, a third trigger circuit having its normal input connected to the output of the fifth gate and its inhibiting input connected to the output of the sixth gate and means for connecting the output of the trigger circuit to the input coincidence gate of the second store.

10. A storage apparatus according to claim 5 and in which the first signal store stores binary digit signals in a form which changes its state once at an intermediate time during an inter-digit period, the change of state being in one sense when a 1 type binary digit is being stored and in the other sense when a 0 type binary digit is being stored.

11. A storage apparatus according to claim 10 and in which the said first signal store stores binary digit signals as magnetization patterns on a magnetic recording surface, the orientation of the magnetization being reversed once at an intermediate time during nn inter-digit period.

12. A storage apparatus according to claim 10 and comprising a first and a second output coincidence gate in the first signal store, means for reading out stored digit signals in the form in which they are stored and in a form inverse thereto, means for feeding these two forms of signals to the first and output second coincidence gates respectively, both these gates being controlled by first store timing pulses whereby an output is produced by one or the other of the gates on receipt of a first store timing pulse according to the nature of the read binary signal, and a trigger supplied with the outputs of the first and second coincidence gates on its normal and inverse input connections respectively, whereby the trigger produces an output which is the read binary signals in coalesced form.

References Cited in the file of this patent

UNITED STATES PATENTS 2,679,638 Bensky et al. ____________ May 25, 1954